(12) United States Patent
Hornung et al.

(10) Patent No.: US 11,118,653 B2
(45) Date of Patent: Sep. 14, 2021

(54) DISPENSER FOR COIL ADHESIVE WEIGHTS WITH DUAL LOADING SYSTEM

(71) Applicant: WEGMANN automotive GmbH, Veitshöchheim (DE)

(72) Inventors: Thomas Hornung, Würzburg (DE); Mirko Pröstler, Himmelstadt (DE); Benedikt Kuhn, Güntersleben (DE)

(73) Assignee: WEGMANN automotive GmbH, Veitshöchheim (DE)

( * ) Notice: Subject to any disclaimer, the term of this patent is extended or adjusted under 35 U.S.C. 154(b) by 0 days.

(21) Appl. No.: 17/064,130

(22) Filed: Oct. 6, 2020

(65) Prior Publication Data
US 2021/0190174 A1    Jun. 24, 2021

Related U.S. Application Data

(63) Continuation of application No. PCT/EP2019/059446, filed on Apr. 12, 2019.

(30) Foreign Application Priority Data

Apr. 12, 2018  (EP) .................................... 18166941

(51) Int. Cl.
 *B65H 16/00*   (2006.01)
 *F16F 15/32*   (2006.01)
(52) U.S. Cl.
 CPC ......... *F16F 15/328* (2013.01); *B65H 16/005* (2013.01)
(58) Field of Classification Search
 CPC ............................ B65H 16/005; F16F 15/328
 See application file for complete search history.

(56) References Cited

U.S. PATENT DOCUMENTS

| | | |
|---|---|---|
| 3,960,409 A | 6/1976 | Songer |
| 2019/0070740 A1* | 3/2019 | Taylor ................ B65H 35/0013 |

FOREIGN PATENT DOCUMENTS

| | | |
|---|---|---|
| CN | 1955508 | 5/2007 |
| CN | 106414273 | 2/2017 |
| CN | 107044507 | 8/2017 |

(Continued)

OTHER PUBLICATIONS

Office Action Issued in Corresponding Chinese Patent Application No. 201980016825.3, dated Mar. 25, 2021.

(Continued)

*Primary Examiner* — Gene O Crawford
*Assistant Examiner* — Ayodeji T Ojofeitimi
(74) *Attorney, Agent, or Firm* — Norton Rose Fulbright US LLP

(57) ABSTRACT

A device for delivery of balancing weights for wheels, comprises a material storage, a feeder and a partitioning unit.

In some embodiments, the feeder has a cylinder segment shaped feeder head, linearly moveable between a loading position and a delivery position.

In some embodiments, the partitioning unit comprises a transport means for transport of a belt of balancing weight segments and a belt cutter for making a balancing weight by cutting at least one or multiple sections from the belt. In some embodiments, the partitioning unit further comprises two loaders for each holding a balancing weight when the feeder is not in a loading position and loading it on the feeder when the feeder is in the loading position.

15 Claims, 10 Drawing Sheets

(56) References Cited

FOREIGN PATENT DOCUMENTS

| EP | 1253414 | 10/2002 |
|----|---------|---------|
| EP | 2984366 | 2/2016 |
| EP | 3040578 | 7/2016 |
| WO | 2017/062445 | 10/2019 |
| WO | WO 2019/197622 | 10/2019 |

OTHER PUBLICATIONS

Search Report Issued in Corresponding Chinese Patent Application No. 2019800168253, dated Feb. 19, 2021.
International Search Report and Written Opinion for PCT/EP2019/059446 dated Jun. 13, 2019 by European Patent Office, 13 pages.
Notice of Intent to Grant and Text Intended for Grant for EP19716898.2 dated Jan. 14, 2020 by European Patent Office, 70 pages.
European Search Report for EP18166941 dated Oct. 11, 2018 by European Patent Office, 7 pages.

* cited by examiner

DISPENSER FOR COIL ADHESIVE WEIGHTS WITH DUAL LOADING SYSTEM

CROSS-REFERENCE TO RELATED APPLICATIONS

This application is a continuation of pending International Application No. PCT/EP2019/059446 filed on 12 Apr. 2019, which designates the United States and claims priority from European Application No. 18166941.7 filed on 12 Apr. 2018, both of which applications are incorporated herein by reference.

BACKGROUND

1. Field of the Invention

The invention relates to an automatic feeding device for balancing weights, preferably self-adhesive balancing weights. Such balancing weights may be used for balancing wheels of vehicles.

2. Description of Relevant Art

For balancing vehicle wheels, balancing weights are used. Self-adhesive balancing weights include segments of a mass material which may be a metal, like zinc or steel, having a self-adhesive tape at one side, by which the mass material may be held to a rim of a wheel. Multiple pieces or segments of such a mass material are held together by a strip of adhesive tape, forming a chain or a belt of balancing weights. The self-adhesive tape is protected by a liner, also referred to as backing at the side opposite to the balancing weight segments. Before applying a balancing weight to a rim, the liner is removed.

U.S. Pat. No. 3,960,409 shows such a belt of balancing weights which may have a significant length and which may be wound up to a coil to simplify storage.

A zinc balancing weight including a magnetic inlay is disclosed in EP 2 984 366.

EP 1 253 414 A2 discloses a complex dispensing device for balancing weights. Here, the liner is removed from the self-adhesive tape, then sections of balancing weight are cut from the tape and directly fed to an applicator. The applicator is then pressed against the rim of a wheel, such that the adhesive balancing weights stick to the rim.

An apparatus for applying weight material onto a wheel by means of a conveyor assembly is disclosed in WO 2017/062445 A1.

An automatic dispenser for balancing weights ready for manual application on a rim is disclosed in EP 3 040 578 A1.

SUMMARY

The embodiments are providing a fast feeding device for balancing weights including at least one balancing weight segment on an adhesive tape further having a protective liner. The feeding device is configured to deliver a selected mass of self-adhesive balancing weight sections with high speed, and allows handling of small balancing weight segments. The dispenser should be integratable into a fully automatic tire balancing machine.

In an embodiment, a device for delivery of balancing weights for wheels includes at least a partitioning unit configured to provide a balancing weight to a feeder. The feeder may include a feeder head which is preferably held by a positioning device which may be an industrial robot or a linear drive. The device for delivery of balancing weights may include at least one feeder.

In a first embodiment, the feeder is a plate or a box. Preferably, the feeder head may be cylinder-segment-shaped defining a cylinder axis. In this case, it is preferably not intended to have only a rotational movement about a cylinder axis of the feeder head without an additional linear movement, as this would not allow for a proper spatial separation of the loading position and the delivery position. Alternatively to or in combination with a linear movement, the feeder head may be configured for a pivoting movement about an axis outside of the cylinder segment and most preferably orthogonal to the cylinder axis of the feeder head.

In the delivery position, the feeder head may bear at least one balancing weight. As will be explained later, preferably at least one balancing weight is located on the feeder with the adhesive tape on the side distant to the feeder. A balancing machine may include a handling device which for example may be an industrial robot to move a wheel into close proximity to the feeder and apply the adhesive balancing weights to the rim. In a further embodiment, a partitioning unit is provided for cutting desired mass sections from a belt of balancing weight segments and loading these segments on the feeder head. Herein, the cut mass sections including at least one or preferably a plurality of balancing weight segments are referred to as balancing weight.

A belt of balancing weight segments includes an adhesive tape bearing a plurality of balancing weight segments. Such balancing weight segments include a mass material which may further include at least one of zinc, iron, steel, or any other suitable material. Preferably, each balancing weight segment includes at least a ferromagnetic material, like iron or steel. Preferably, it includes a ferromagnetic inlay and most preferably a steel inlay. The ferromagnetic inlay allows pulling of the balancing weight segments by a magnet. Preferably, the balancing weight segments have a comparatively small mass, like 5 grams, 10 grams, or even a fraction thereof. The balancing weights are held together on one side of an adhesive tape. The other side of the adhesive tape is protected by a liner, which must be removed before sticking the tape to a rim.

The partitioning unit is fed by a belt of balancing weight segments. The partitioning unit forms individual balancing weights of a desired mass by cutting sections from the belt of balancing weight segments corresponding in mass to a required balancing weight mass. If, for example, a balancing weight of 25 grams is desired and the belt of balancing weight segments includes of segments having a mass of 5 grams, the partitioning unit cuts a section of 5 balancing weight segments from the belt. This balancing weight is then placed on the feeder head. A further embodiment relates to a partitioning unit for forming balancing weights of a desired mass from a belt of balancing weight segments. The partitioning unit includes belt drive means, means for removal of the liner, at least one belt cutter, and at least one loader including a slide system for releasing the balancing weights and preferably for placing the balancing weights on the feeder head.

In the partitioning unit, preferably at least one weight sensor is provided. This weight sensor detects the presence of a balancing weight segment and/or the presence of a gap between balancing weight segments. Therefore, the sensor may count the number of balancing weight segments passing through the sensor which allows a precise determination of the dispensed mass of the balancing weight. The sensor may also allow a precise determination of the position of a gap between balancing weight segments, which gives a precise reference for a cutter separating the balancing weight segments. Finally, the weight sensor may be used to detect faulty and/or missing balancing weight segments and/or the end of the belt of balancing weight segments.

Further, a precision belt drive means, like a gear wheel or a wheel having dents or sprockets forming indentations in the flexible adhesive tape and therefore increasing friction, may be provided.

Furthermore, the partitioning unit may include a belt slide, which may be arranged after the precision belt drive. This belt slide preferably provides a guidance of the belt and preferably holds the belt in position to provide a counter force to a cutter which is preferably arranged at the end or within a gap of the slide. There may be a further slide or moving means behind the cutter to move the balancing weights to a loader.

The cutter preferably is a knife on a cutter actuator which moves the knife through a gap between two balancing weight segments to cut the adhesive tapes between these two balancing weight segments.

In an embodiment, a liner removal means may be provided, which preferably pulls the liner from the adhesive tape just before the cutter cuts the adhesive tape. The liner removal means may be configured to remove the liner after the precision belt drive, such that the belt of balancing weight segments has the liner in place when passing the precision belt drive, such that the precision belt drive does not stick to the tape. The liner may be removed in one piece before cutting the adhesive tape. The liner removal device preferably includes an edge around which the liner is moved and preferably pulled by at least one pulley and/or roll. The removed liner may be stored on a liner reel.

To deliver a balancing weight from the cutter to the feeder head, at least one balancing weight loader is provided. Preferably, there are two balancing weight loaders to increase throughput. The loaders may be arranged on a loader assembly. A loader includes at least a slide, a left weight clamp and a right weight clamp. The slide may be straight but is preferably arc shaped and most preferably adapted to the contour of the feeder head. Preferably, both weight clamps are basically arranged above the slide and preferably have a shape adapted to the contour of the slide. Before loading a balancing weight on the slide, the slide is moved close to the cutter or a further slide or moving means behind the cutter to move the balancing weights to the loader. Furthermore, the clamps are in an open position which means that they have a distance, such that a balancing weight may easily slide on the slide between the clamps. In that state, the belt drive means is operated to move a required number of balancing weight segments beyond the cutter. Then the belt drive means is stopped and the clamps are moved into a closed position where they are such close to each other that the balancing weight is held in its position. To load at least a second balancing weight loader, the loaders are mounted on a loader assembly, which is movable, such that each of the loaders may be positioned close behind the cutter to pick up a balancing weight. Such, one after another loader may be loaded with a balancing weight.

If the loader or all desired loaders have been loaded with balancing weights, the feeder head is moved in a position under the at least one loaders and the slides of the at least one loaders are moved sideward while the clamps go into an open position, such releasing the balancing weights to the feeder head. The balancing weights now are held by magnets in their positions on the feeder head.

Preferably, the loaders of the loader assembly are configured to load balancing weights at approximately the same time on the feeder.

In the loaders, preferably at least one loader actuator is provided to operate the clamps and the slide.

The balancing weights are placed on the slides, such that the adhesive tape without liner is on top, e.g. distant from the slide surface, such that it does not contact the slide surface and the balancing weights do not stick to the slide.

For providing the belt of balancing weight segments to the partitioning unit, a balancing weight material storage may be provided. The storage may include a comparatively large reel having a large amount of belted balancing weight segments. There may be drive means and transporting means for transporting the belt of balancing weight segments to the partitioning unit. These transporting means may further include a plurality of roles on which the belt of balancing weights may role with low resistance. Furthermore, a length compensation means may be provided close to the partitioning unit, such that always a required amount of balancing weight material can be fed to the partitioning unit, independent of the rotation of a large storage reel in the balancing weight material storage.

A further embodiment may include at least a partitioning unit configured to deliver a balancing weight to a feeder. The partitioning unit may include
- at least one transport means for transport of a belt of balancing weight segments,
- a belt cutter for making at least one balancing weight by cutting at least one section including at least one balancing weight segment from the belt of balancing weight segments, and
- at least one loader for holding the at least one balancing weight and loading it on the feeder, when the feeder is in a loading position.

Furthermore, a transfer slide may be provided to transfer a balancing weight into a balancing weight container instead of loading it on the feeder. This may be used either for providing a balancing weight for manual application or for disposing of a faulty or unwanted balancing weight.

This embodiment may be combined with all other embodiments disclosed herein.

A method for delivery of balancing weights for wheels may include at least the following steps in the sequence of:
a) providing a belt of balancing weight segments,
b) making at least one balancing weight by cutting at least one section including at least one balancing weight segment from the belt of balancing weight segments,
c) holding the at least one balancing weight by a loader. This step may further include the steps of:
c1) moving the at least one balancing weight (520) by at least one slide, and
c2) holding the balancing weight by at least one a pair of clamps on the loader.

Finally, the balancing weight may be released.

A further method may further include the following steps in the sequence of:
a) providing a belt of balancing weight segments,
b) moving a loader assembly comprising a first loader and a second loader into a first position,
c) making a first balancing weight by cutting a section comprising at least one balancing weight segment from the belt of balancing weight segments,
d) holding the first balancing weight by the first loader, (this step may include sub steps c1 and c2 as disclosed above)
e) moving the loader assembly into a second position, f) making a second balancing weight by cutting a section comprising at least one balancing weight segment from the belt of balancing weight segments,
g) holding the second balancing weight by the second loader, (this step may include sub steps c1 and c2 as disclosed above)
h) releasing the balancing weights.

In general, all embodiments disclosed herein or parts thereof may be combined in any combination.

BRIEF DESCRIPTION OF THE DRAWINGS

In the following, the invention will be described by way of example, without limitation of the general inventive concept, on examples of embodiment and with reference to the drawings.

Figure 1:
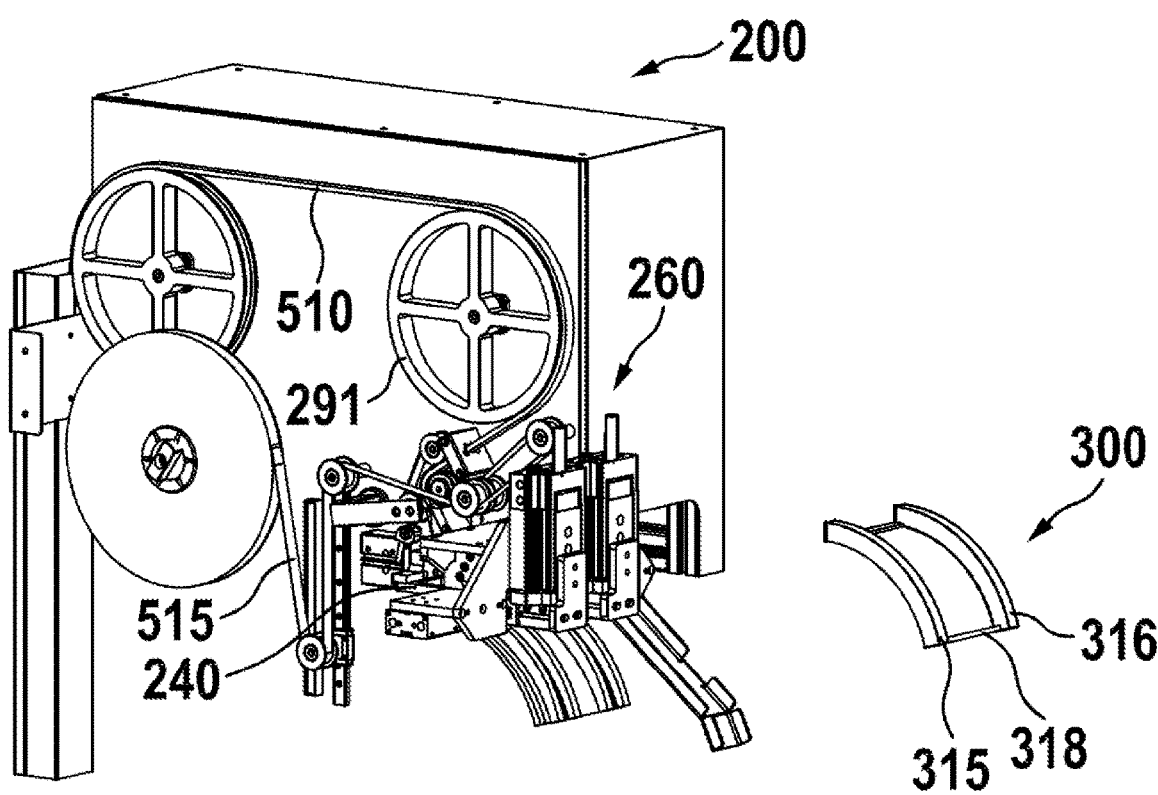
FIG. 1 shows a first embodiment.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

In FIG. 1, a first embodiment is shown. Specifically, this figure shows a partitioning unit 200 and a feeder 300. A belt of balancing weight segments 510 is transferred by a transport means, like belt wheels 291 to a belt cutter 240. At some distance, preferably a small distance before the cutter 240, a liner is stripped off the belt of balancing weight segments. Behind the cutter 240, a loader assembly 260 is arranged to transfer balancing weights on the feeder 300.

The feeder 300 includes at least one balancing weight holder 315 and preferably two balancing weight holders 315, 316 to hold at least one balancing weight. The balancing weight holders may be mechanically connected together, for example by at least one strut 318. The feeder may be held and moved by a positioning device (not shown here), which may be an industrial robot 600 or a linear drive, between at least one loading position adjacent to the loader assembly and at least one transfer position in which balancing weights may be transferred from the feeder 300 to a wheel. In at least one of the loading positions, balancing weights may be placed by loaders of the loader assembly (as will be shown later) on the feeder. After loading the feeder with at least one balancing weight in a loading position, the feeder may be moved to a delivery position distant from the loading position and preferably distant of the partitioning unit.

Figure 2:
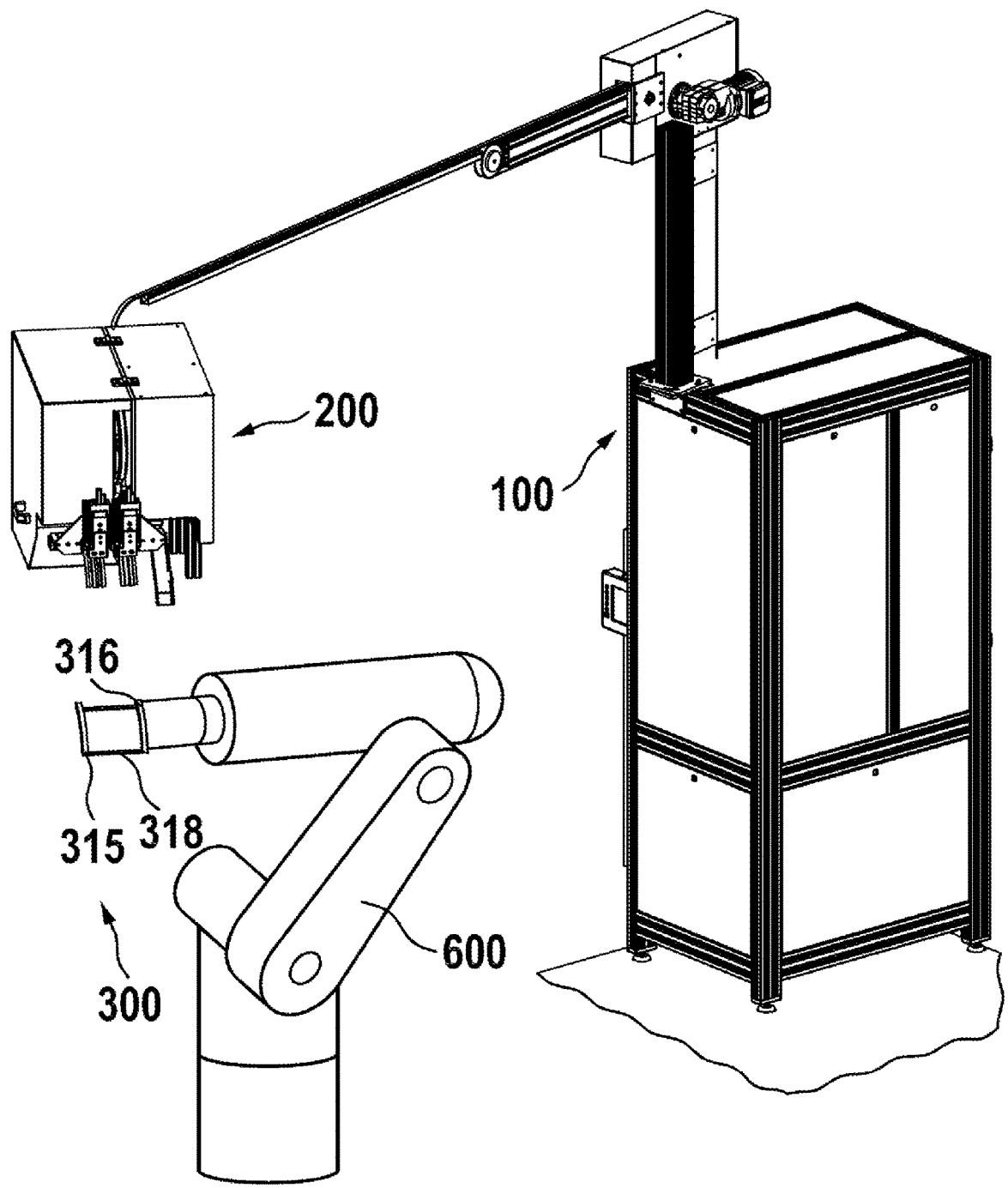
FIG. 2 shows an overview.

FIG. 2 shows an overview of the device for delivery of balancing weights for wheels. A balancing weight material storage 100 stores a belt of balancing weight segments and delivers these weights on the belt to a partitioning unit 200. The partitioning unit 200 cuts the belt of balancing weight segments into individual balancing weights and loads these balancing weights on a feeder 300, from which the balancing weights may be picked up or attached to a wheel. Here, an exemplary industrial robot 600 is shown.

Figure 3:
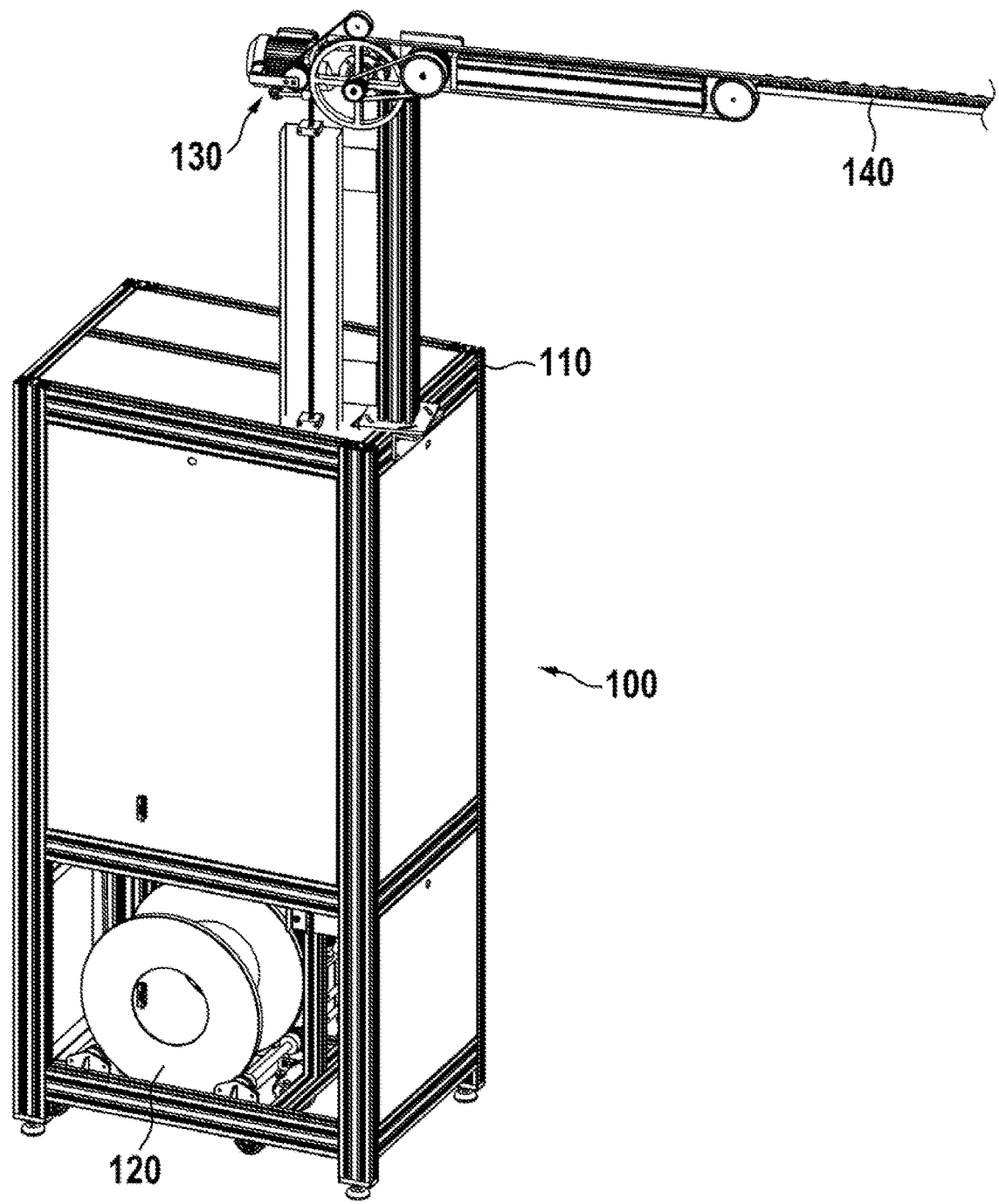
FIG. 3 shows more details of the balancing weight material storage.

In FIG. 3, more details of the balancing weight material storage 100 are shown. Preferably, a reel 120 holds the belt of balancing weight segments. In this example, the reel is a comparatively large reel, holding 120 kg of balancing weight material. A housing 110 may enclose the reel 120 and further balancing weight material buffering and transport devices. Furthermore, a controller of the storage and/or the whole device may be contained in the housing. A drive system 130, preferably comprising a motor is further part of the storage 100. A transport system 140 may be provided, which preferably includes at least one of a drive belt, a pulley and supporting rolls to transport the belt of balancing material to the partitioning unit.

Figure 4:
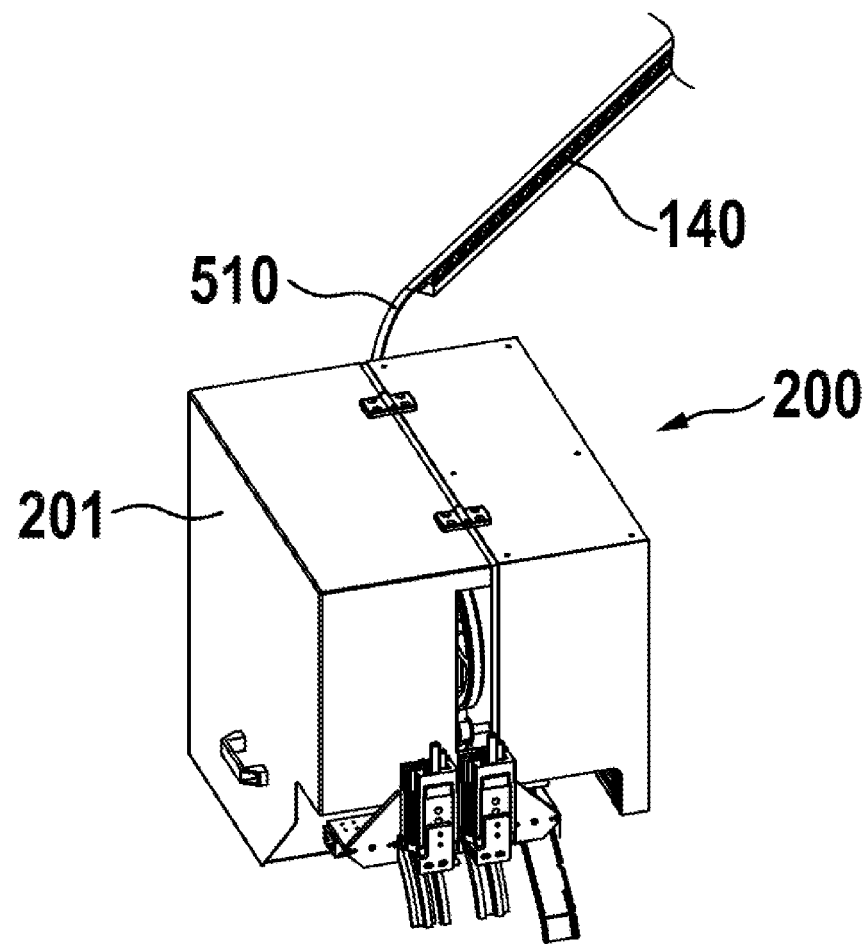
FIG. 4 is a more detailed view of the partitioning unit and the feeder.
Figure 4:
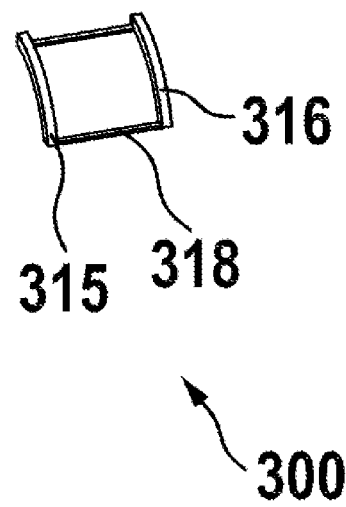

In FIG. 4, a more detailed view of the partitioning unit 200 and the feeder 300 is shown. At the top of the drawing, the transport system 140 for transporting balancing weight material 510 from storage 100 is shown. Preferably, a cover 201 is provided to cover and protect the mechanical components of the partitioning unit. Under the partitioning unit, preferably at least one balancing weight container may be provided. Such a container may contain balancing weights made by the partitioning unit and placed on a transfer slide instead of the feeder, as will be explained later.

Figure 5:
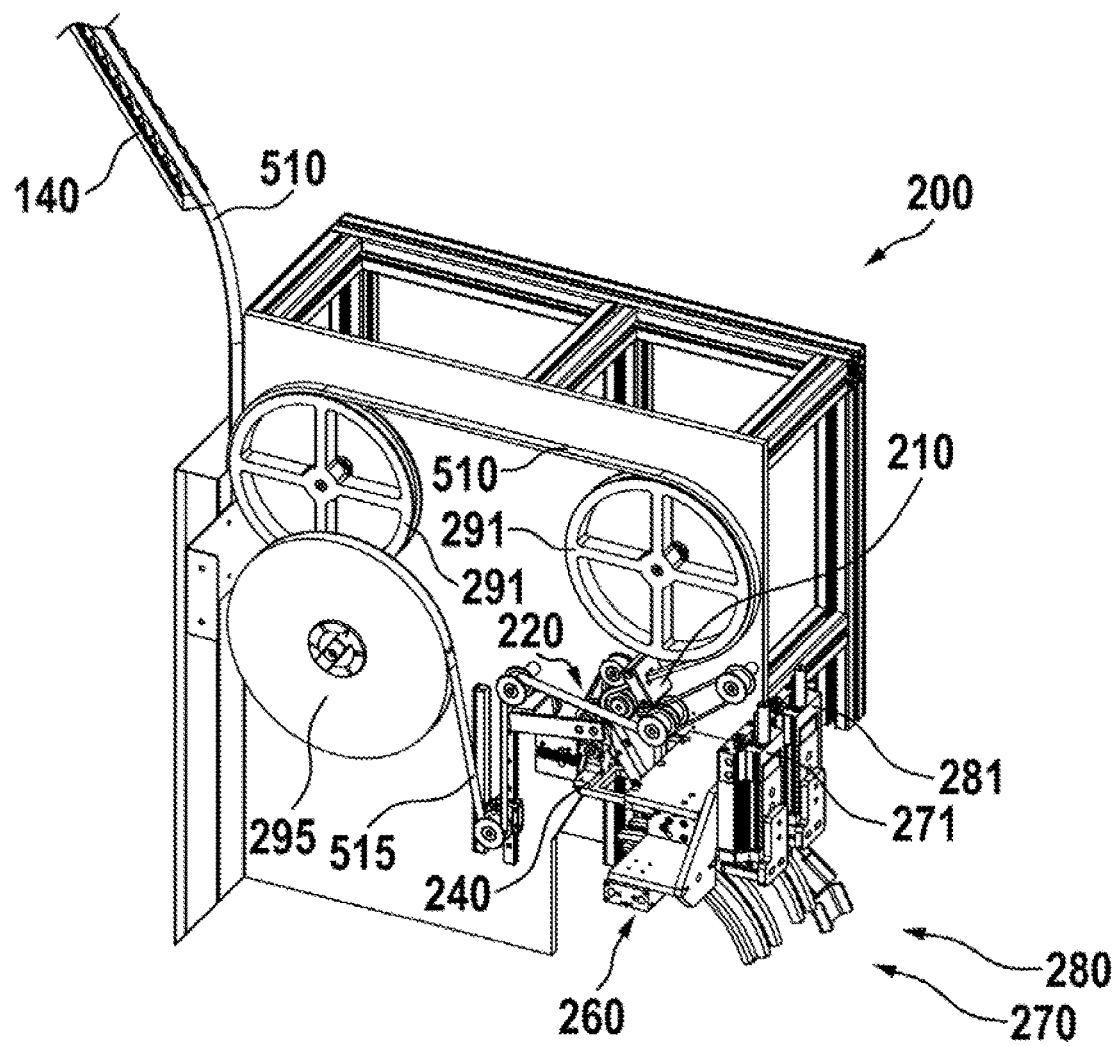
FIG. 5 shows more details of the partitioning unit.
Figure 5:
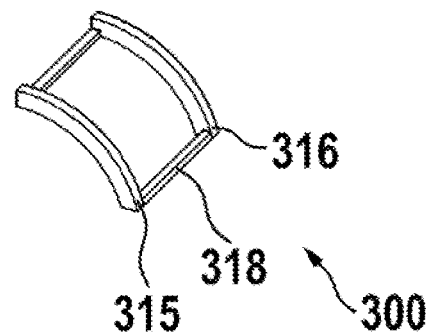

In FIG. 5, more details of the partitioning unit 200 are shown. Here, the belt of balancing weight segments 510 is supported and may be driven via belt wheels 291. From the right belt wheel, it is fed through a weight sensor 210 and a precision belt drive 220 to a belt cutter 240. Behind the belt cutter 240 is a loader assembly 260 bearing a first loader 270 and a second loader 280. The loader assembly preferably can be moved independently of the feeder 300, such that balancing weight material can be fed in either loader. A liner wheel 295 may be provided to collect the liner 515 which preferably is peeled off the belt of balancing weights before reaching the cutter.

This figure further shows details of the feeder 300.

Figure 6:
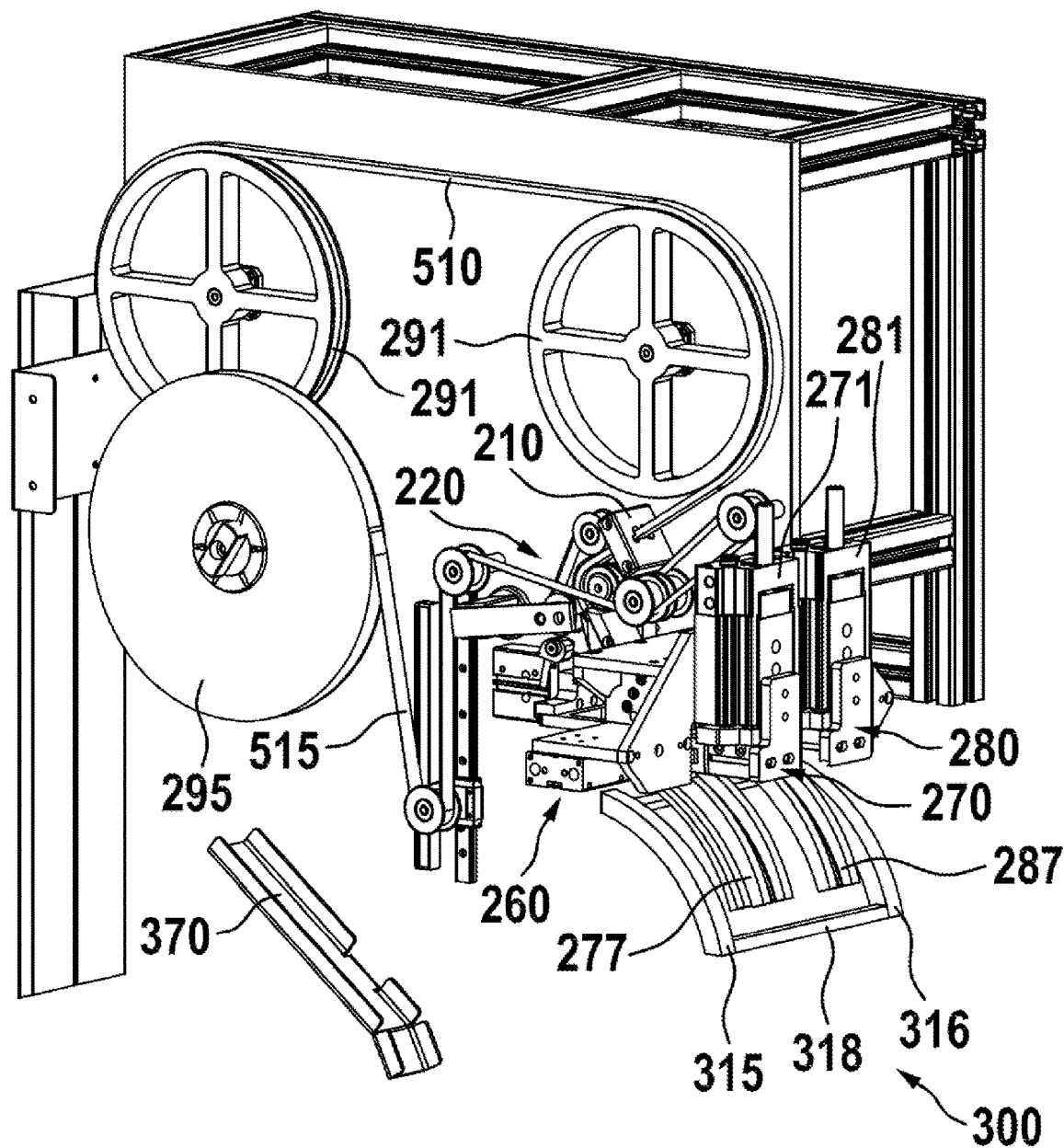
FIG. 6 shows the partitioning unit and the feeder with the feeder in the loading position.

In FIG. 6, the partitioning unit 200 and the feeder 300 with the feeder in the loading position are shown. Here, the feeder head is below the first weight slide 277 and/or the second weight slide 287, such that balancing weights on the slides may be loaded on the feeder 300. Furthermore, here the transfer slide 370 can clearly be seen. Preferably, this slide is movable together with the feeder 300. It may be mounted to the same positioning device or a different positioning device. For the case that balancing weights should not be provided on the feeder 300, but in a balancing weight container, the transfer slide 370 is placed under a loader instead of the feeder head, such that a balancing weight delivered by the loader slides downward the slide into balancing weight container. This mode is useful for producing preferably high quantities of specific balancing weights without directly attaching them to a wheel. Such balancing weights may be spare parts or they may be used at a later time, and preferably they may be attached manually to a wheel.

Figure 7:
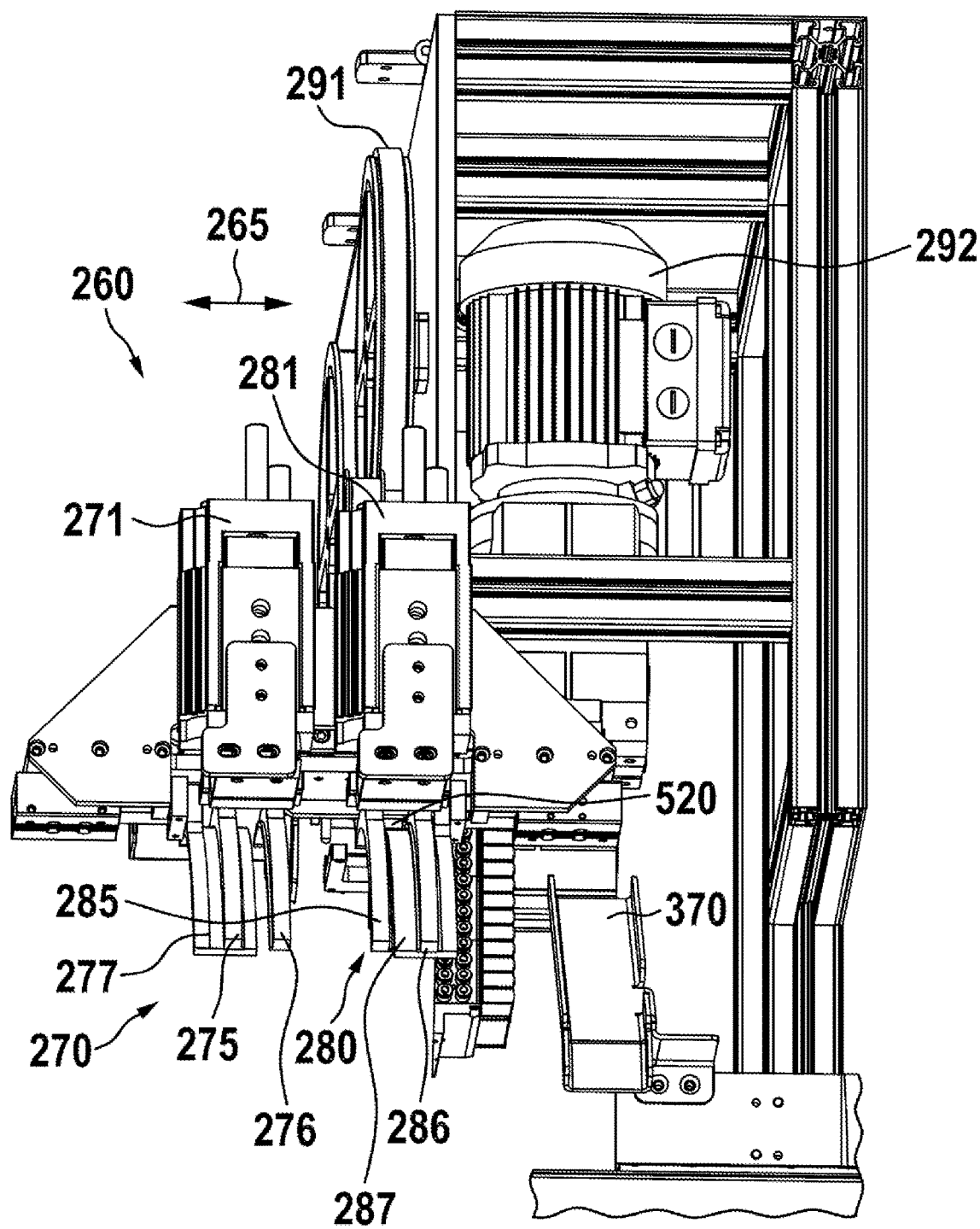
FIG. 7 is a detailed view of the loaders.

In FIG. 7, a detailed view of the loaders 270, 280 is shown. The loader assembly 260 includes a first loader 270 and a second loader 280. The loader assembly is movable in direction 265 such that either the first loader or the second loader is in a position close to the belt cutter 240 to get a portion of balancing weight material. Each loader includes a pair of weight clamps 275, 276, 285, 286 and a weight slide 277, 287 below the weight clamps. The weight clamps and the slides are operated by a loader actuator 271, 281.

Here, the first loader has a first left weight clamp 275, a first right weight clamp 276, and a first weight slide 277, all of them preferably operated by first loader actuator 271. The second loader includes a second left weight clamp 285, a second right weight clamp 286, and a second weight slide 287 below the clamps. Also here, the clamps and the slider are operated by second loader actuator 281. In this figure, the second weight slide 287 is in a first supporting position below both weight clamps and therefore bridges the gap between the second left weight clamp 285 and second right weight clamp 286, such that a balancing weight 520 may be held on the slide. The first weight slide 277 may be shifted from a first supporting position (not shown) to the left into a second position, such that it does not support the at least one balancing weight, and therefore forms at least a partial gap between the first left weight clamp 275 and the first right weight clamp 276. If the gap would be fully open, and the clamps are open, it would allow to drop a balancing weight from the loader to the feeder 300, if the feeder head is in the loading position. The clamps may be configured to hold in a closed state the at least one balancing weight, even if the weight slide is in a second, non-supporting position. In an open state, the clamps may act as a guide for guiding the balancing weight sliding on a slide. Open clamps may have a gap wider than the width of the at least one balancing weight. Closed clamps may press on opposing sides of the at least one balancing to assert a holding force. The embodiment shown herein has two loaders, but a higher number of loaders may also be used.

In FIG. 8, the operation of a loader in detail is shown. In FIG. 8A, it is shown how a balancing weight 520 is shifted or slides on the slide 277. This view is from FIG. 7, where the cutter is behind the slide. Therefore, the direction of movement of the weight material is out of the drawing plane. Here, the adhesive tape 525 is on top of the balancing weight, such that it does not stick to the slide 277. The first weight clamp 275 and the second weight clamp 276 form a gap being sufficiently wide that the balancing weight may easily slide through this gap. At this stage, the later balancing weight is still part of the belt of balancing weight segments. This means, that at this stage, preferably the belt of balancing weights is shifted on the slide and passes the belt cutter 240. After a desired number of balancing weight segments have passed the cutter, the cutter may be operated to cut or sever the desired number of balancing weights segments from the belt of balancing weight segments. The separated number of balancing weight segments now forms a balancing weight. This balancing weight may now be held or fixed in its position by the loader, by simply closing the gap between the clamps and the balancing weight, thus moving the clamps in a direction to each other. By asserting a certain pressure on the balancing weight, friction between the balancing weight and the clamp can be increased, and therefore the balancing weight may be fixed at its position. Preferably, fixing the balancing weight is even done before operating the cutter, such that the belt of balancing weights is in a well-defined and fixed position for the cutting process. The fixed state still on the slide is shown in FIG. 8B.

Figure 8A:
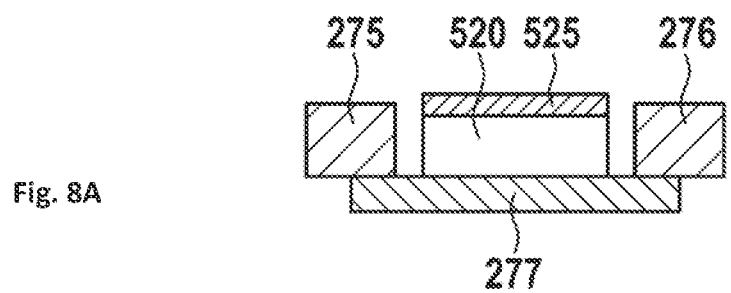
FIGS. 8A-8D show the operation of a loader in detail.
Figure 8B:
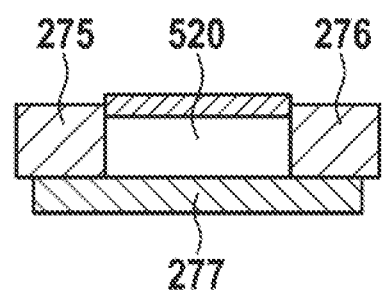
Figure 8C:
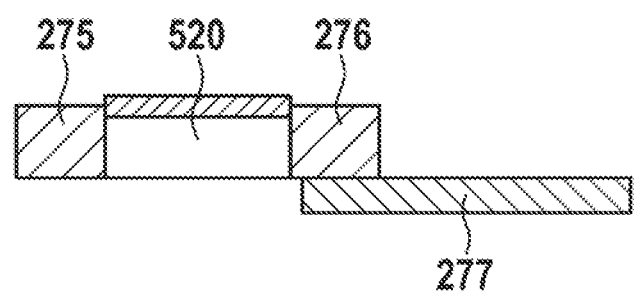

In FIG. 8C, the slide has been removed under the balancing weight, but the clamps still hold the balancing weight in place. It is obvious that the slide may be moved to either side, although in this figure a movement to the right side is shown.

Figure 8D:
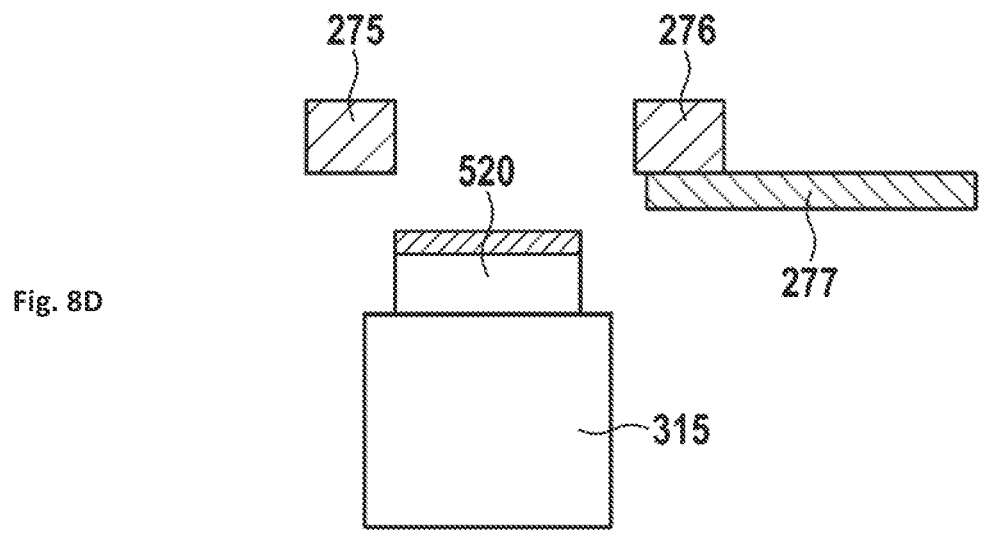

The final stage is shown in FIG. 8D. Here, the feeder head has been brought into its loading position below the loader. Now, the clamps are opened by increasing the distance between the clamps, and therefore releasing the balancing weights which will then drop on the feeder head. The balancing weight may further be held to the feeder head by magnets, preferably electromagnets within the feeder head.

Figure 9:
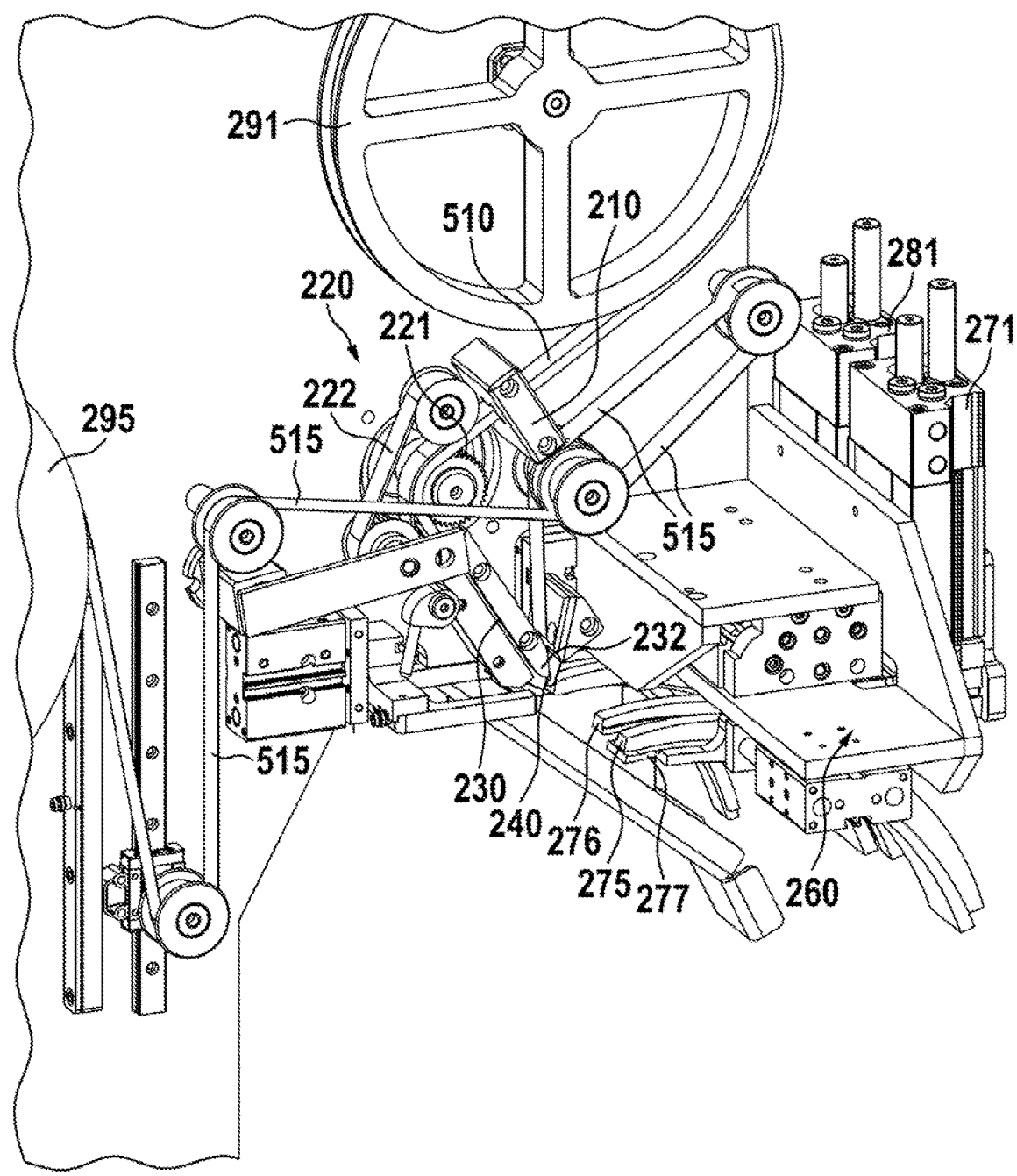
FIG. 9 shows further details of the precision belt drive and belt cutter.

In FIG. 9, further details of the precision belt drive 220 and belt cutter 240 are shown. This figure shows in more detail the path of the belt of balancing weight segments 510. It is supported by belt wheel 291 and proceeds through weight sensor 210. This weight sensor may detect gaps between individual balancing weight segments, and therefore allows for a precise detection of the number of dispended weight segments and thus of the dispended mass. Preferably, the sensor is an optical sensor. It may also be a magnetic or other sensor.

After the sensor, there is a precision belt drive 220 for driving the belt towards the cutter 240. The precision belt drive preferably has a drive wheel 221. It may further have a drive belt 222. The belt drive may be driven by a drive motor 292. The drive wheel may have means for increasing friction to the belt of balancing weights. Such means may for example be teeth or dents or other protrusions. The drive wheel may interact with the side of the belt of balancing weights bearing the adhesive tape. After the precision belt drive, there is a belt guide 230 for guiding the belt to the belt cutter 240. It is obvious that the weight sensor may be located at any place which preferably is not too far distant from the belt cutter. It may be located directly before the belt cutter, before, or after the precision belt drive. In this figure, it is also shown, how the liner is removed from the belt of balancing weight segments. It is pulled in one piece over an edge 232 of the belt guide. It is pulled under an angle away from the belt of balancing weights, which is preferably a right angle, but preferably may be any angle between 30 and 150 degrees. The liner 525 is then guided by a couple of roles to a liner reel 295, which preferably collects the whole liner in one piece.

Figure 10:
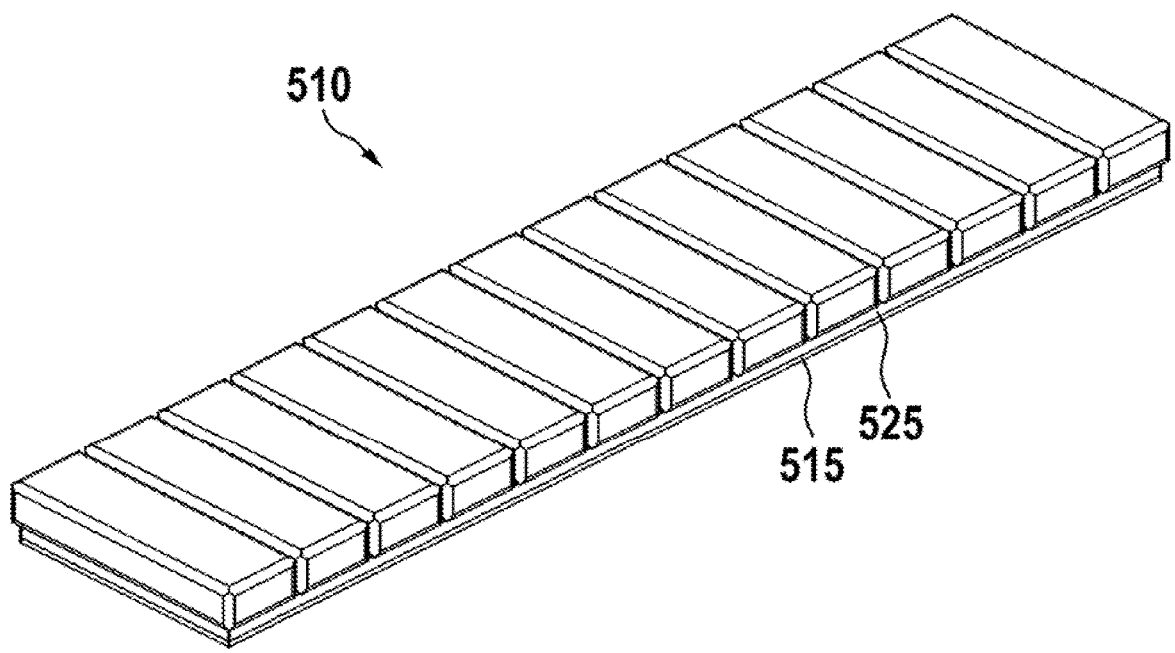
FIG. 10 is a section of a belt of balancing weight segments.

In FIG. 10, a section of a belt of balancing weight segments 510 is shown.

Figure 11:
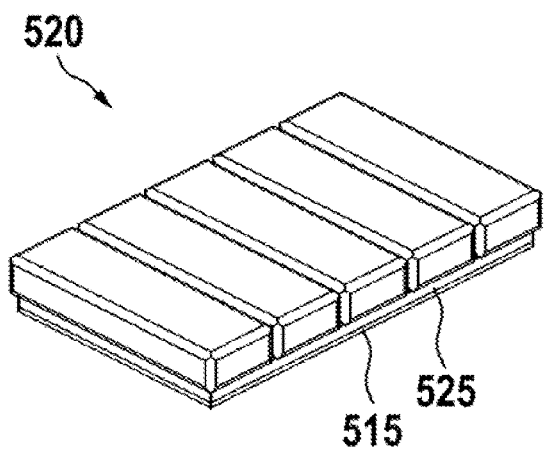
FIG. 11 shows an exemplary balancing weight.

In FIG. 11, an exemplary balancing weight 520 is shown. Here, the balancing weight includes five balancing weight segments held together by an adhesive tape 525 which is further protected by a liner 515 at its bottom.

It will be appreciated to those skilled in the art having the benefit of this disclosure that this invention is believed to provide a device and a method for delivery of balancing weights for wheels. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 100 balancing weight material storage
120 reel
130 drive system
140 transport system
200 partitioning unit
201 cover
210 weight sensor
220 precision belt drive
221 drive wheel
222 drive belt
230 belt guide
240 belt cutter
260 loader assembly
265 direction of movement of the loader assembly
270 first loader
271 first loader actuator
275 first left weight clamp
276 first right weight clamp
277 first weight slide
280 second loader
281 second loader actuator
285 second left weight clamp
286 second right weight clamp
287 second weight slide
291 belt wheel
292 drive motor
295 liner reel
300 feeder
315 first balancing weight holder
316 second balancing weight holder
318 strut
370 transfer slide
510 belt of balancing weight segments
515 liner
520 balancing weight
525 adhesive tape
600 industrial robot

The invention claimed is:

1. A device for delivery of balancing weights for wheels, the device comprising at least a partitioning unit configured to deliver a balancing weight to a feeder, the partitioning unit comprising:
at least one transport means configured to transport a belt of balancing weight segments;
a belt cutter configured to form at least one balancing weight by cutting at least one section from the belt of balancing weight segments, the at least one section comprising at least one balancing weight segment; and
at least one loader configured to hold the at least one balancing weight and load the at least one balancing weight on the feeder, when the feeder is in a loading position;
wherein the at least one loader comprises a weight slide positionable behind the belt cutter, the weight slide is configured to:
support at least one balancing weight segment from the belt of balancing weight segments before cutting by the belt cutter; and/or
support a balancing weight; and
wherein the weight slide is displaceable from a first supporting position to a second position in which the weight slide does not support the at least one balancing weight and/or balancing weight segment.

2. The device according to claim 1, further comprising a feeder.

3. The device according to claim 1, further comprising a balancing material weight storage configured to supply a belt of balancing weight segments to the partitioning unit, wherein the storage preferably comprises at least one component selected from the group of components consisting of:
means for holding a reel that holds the belt; and
means for transporting the belt to the partitioning unit.

4. The device according to claim 1, wherein the partitioning unit comprises at least one component selected from the group of components consisting of:
means for removal of a liner from the belt of balancing weight segments;
a weight sensor;
a precision belt drive preferably comprising at least a drive wheel and/or a drive belt; and
a belt guide for guiding the belt of balancing weight segments.

5. The device according to claim 1, wherein the at least one loader comprises weight clamps configured to hold the at least one balancing weight.

6. The device according to claim 1, comprising at least one loader assembly, the loader assembly comprising two or more of the loader, the loader assembly being moveable, such that each of the loaders and their respective slides can be positioned behind the belt cutter.

7. The device according to claim 6, wherein a transfer slide is provided to transfer a balancing weight into a balancing weight container instead of loading it on the feeder.

8. A device for delivery of balancing weights for wheels, the device comprising at least a partitioning unit configured to deliver a balancing weight to a feeder, the partitioning unit comprising:
at least one transport means configured to transport a belt of balancing weight segments,
a belt cutter configured to format least one balancing weight by cutting at least one section from the belt of balancing weight segments, the at least one section comprising at least one balancing weight segment; and
a plurality of loaders configured to hold the at least one balancing weight and load the at least one balancing weight on the feeder, when the feeder is in a loading position,
wherein each loader comprises a weight slide positionable behind the cutter and configured to:
support at least one balancing weight segment from the belt of balancing weight segments before cutting by the belt cutter; and/or
to support a balancing weight, and
a loader assembly comprising the loaders, the loader assembly being moveable, such that each of the loaders and their respective slides can be positioned behind the cutter.

9. The device according to claim 8, wherein the loaders of the loader assembly are configured to load balancing weights on the feeder at approximately the same time.

10. The device according to claim 8, wherein the at least one loader comprises weight clamps to hold the at least one balancing weight.

11. The device according to claim 8, further comprising a transfer slide configured to transfer a balancing weight into a balancing weight container instead of loading the balancing weight on the feeder.

12. The device according to claim 8, wherein the partitioning unit comprises at least one component selected from the group of components consisting of:
- means for removal of a liner from the belt of balancing weight segments;
- a weight sensor;
- a precision belt drive preferably comprising at least a drive wheel and/or a drive belt; and
- a belt guide for guiding the belt of balancing weight segments.

13. The device according to claim 8, further comprising a balancing material weight storage configured to supply a belt of balancing weight segments to the partitioning unit, wherein the storage comprises at least one component selected from the group of components consisting of:
- means for holding a reel holding the belt; and
- means for transporting the belt to the partitioning unit.

14. The device according to claim 8, including a feeder.

15. A method for delivery of balancing weights for wheels, the method comprising at least the steps in the sequence of:
- providing a belt of balancing weight segments;
- forming at least one balancing weight by cutting at least one section from the belt of balancing weight segments, the at least one section comprising at least one balancing weight segment;
- holding the at least one balancing weight by a loader, where holding comprises the steps of:
  - moving the at least one balancing weight by at least one slide, and
  - holding the balancing weight by at least a pair of clamps on the loader;
- moving a loader assembly into a first position, the loader assembly comprising a first loader and a second loader;
- forming a first balancing weight by cutting a first section from the belt of balancing weight segments, the section comprising at least one balancing weight segment;
- holding the first balancing weight by the first loader;
- moving the loader assembly into a second position;
- forming a second balancing weight by cutting a second section from the belt of balancing weight segments, the second section comprising at least one balancing weight segment;
- holding the second balancing weight by the second loader; and
- releasing the balancing weights.

* * * * *